Nov. 12, 1929.    N. LANES    1,735,007
PRESSURE FILTER FOR LIQUIDS
Filed Sept. 21, 1928    3 Sheets-Sheet 1

INVENTOR
Nathan Lanes
BY
ATTORNEY

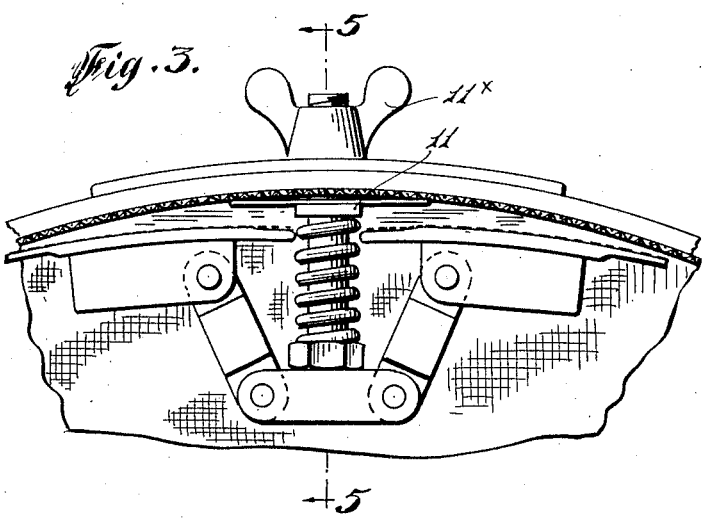
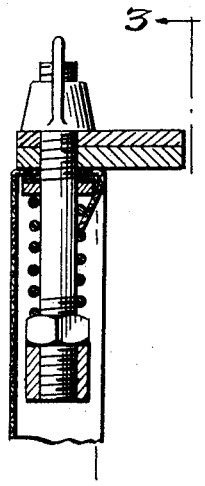
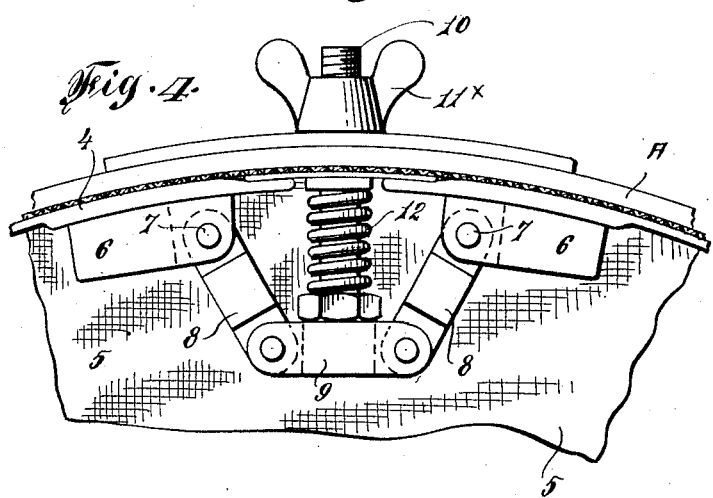
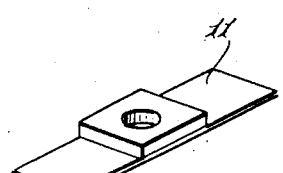
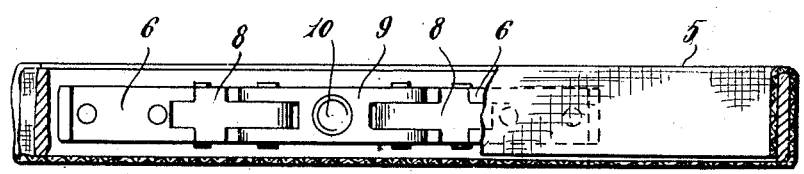

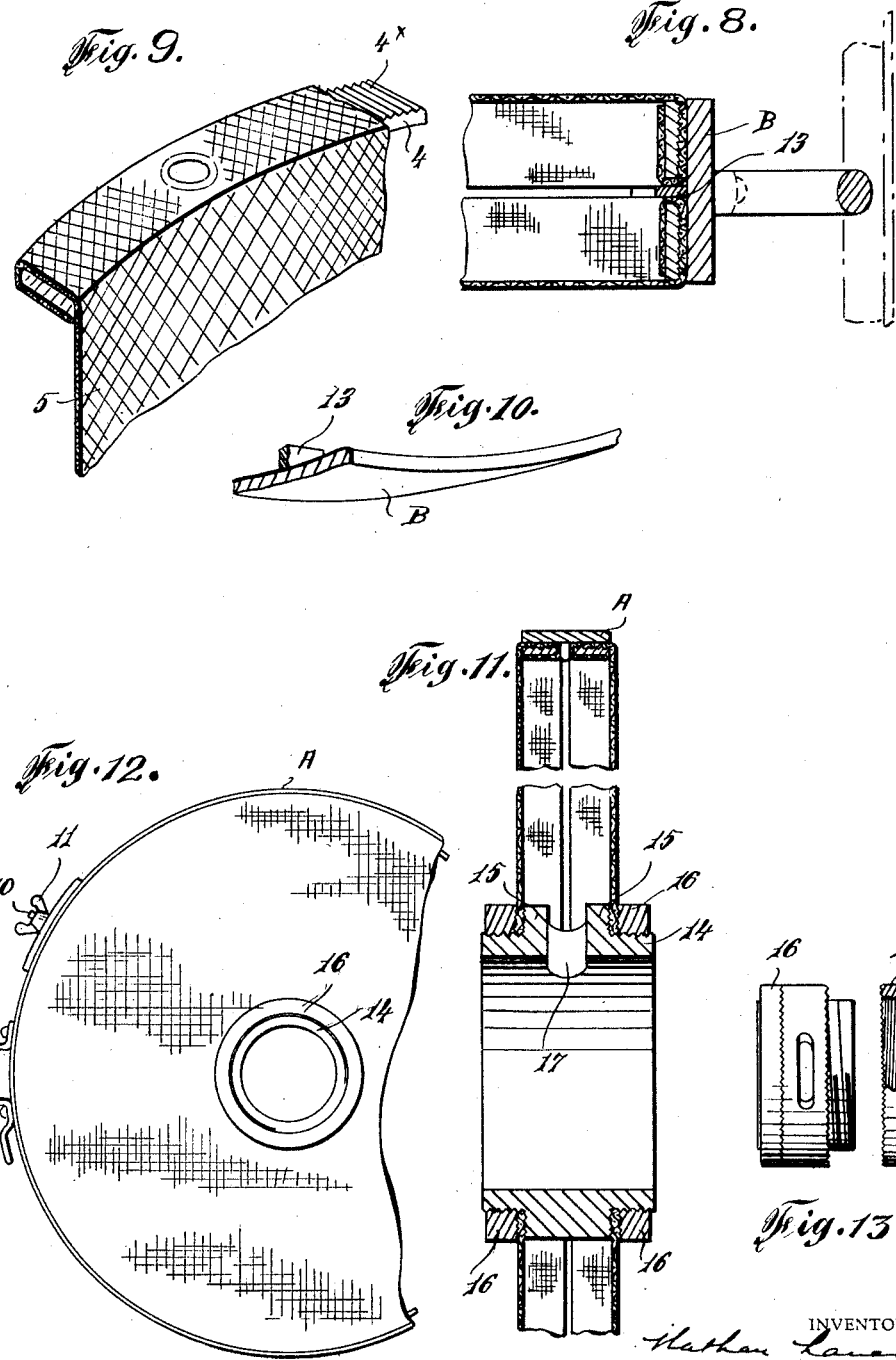

Patented Nov. 12, 1929

1,735,007

UNITED STATES PATENT OFFICE

NATHAN LANES, OF NEW YORK, N. Y.

PRESSURE FILTER FOR LIQUIDS

Application filed September 21, 1928. Serial No. 307,459.

The object of the present invention is to provide a filter for liquids, and more particularly adapted for pharmaceuticals, flavoring extracts, wines, perfumes and the like, comprising a casing for reception of the filtered liquid, the casing being of distinctive form and having removably applied thereto a screen, usually of metal mesh, and expanding into such position that the exterior surface of the screen lies closely adjacent to the plane of the casing. The invention is particularly applicable to drum filters used under pressure, for very fine filtering purposes, wherein joints have been avoided and the screen has been soldered in position. By the present invention it is possible to removably secure the screen to the drum and at the same time effect a tight, pressure-proof joint between the screen and the filter frame. This is a great advantage since the periodic renewal of the screen may be effected without melting solder and re-soldering, which has heretofore required removal of the filters to a shop specially equipped for the purpose.

The invention will be described with reference to the accompanying drawings in which—

Figure 3 is an enlarged detail, partly in section, showing the expanding means in released position, the view being in the direction of the arrows 3—3, Fig. 5;

Figure 4 is a view similar to Fig. 5, showing the expanding means in active position;

Figure 5 is a sectional view on the line 5—5, Fig. 3;

Figure 6 is a bottom plan view of the expanding means in position, the expander ring and screen being shown in section;

Figure 7 is a perspective view of the bridge plate;

Figure 8 is a fragmentary sectional view of the casing, two screens and two expander rings, showing the position and action of a separator shoulder carried by the casing;

Figure 9 is a perspective sectional view, showing the expander ring with the separator shoulder;

Figure 10 is a detail sectional perspective view showing the casing with the separator shoulder;

Figure 11 is a sectional view of the modified form of filter design to be mounted on a hollow shaft for rotation, and Figure 12 is a sectional plan view of the same;

Figure 13 is a view of the hub of the filter shown in Fig. 11 with a clamping ring therefor.

Figure 1:
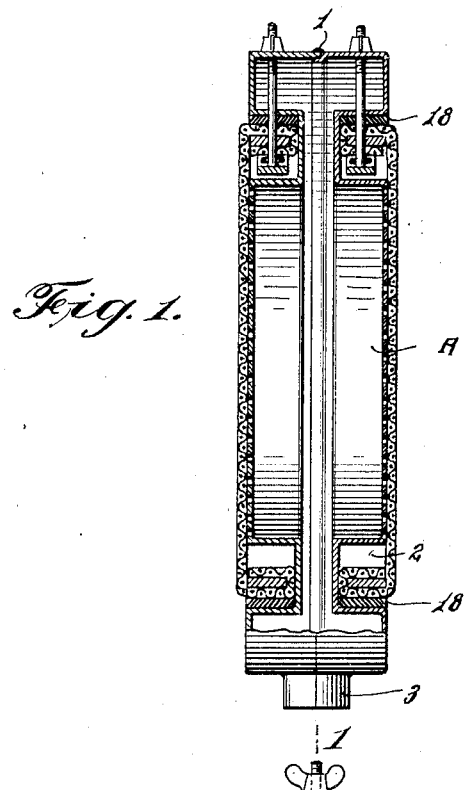
Figure 1 is a view in partial cross section of an embodiment of the invention.

Referring to the drawings, A represents a two-part casing joint at 1. The two halves of the casing are alike and the description of one will suffice for the other.

Within the periphery of the casing and formed in its front face is an annular depression or channel 2, which may be effected through spinning of the metal, or by a die. The section of the casing within the annular ring is perforated so as to admit liquid within the casing. from which it may pass through an outlet neck 3.

Folded about an expander ring 4, preferably in a manner illustrated in Fig. 9, is a screen 5 which may be of fine metal mesh, the fineness to be determined by the character of the liquid to be filtered. The expander ring with the mesh is placed in position within the channel 2. The expander ring is not endless, but is split, and each end carries a small block 6 pivotally connected at 7 to a toggle link 8, the lower end of each link being pivoted to the toggle joint member 9, in which is threaded or otherwise suitably secured a stud 10. The stud projects through a bridge piece 11 serving to fill the gap between the two ends of the expander, the stud thence passing through the wall of the casing A and having threaded thereon a wing nut $11^x$, or having affixed thereto any other means for operating the toggle to expand or contract the expander ring. The expansion may be against the action of a spring 12 surrounding the stud, so that the releasing action of the expander ring may be rapidly effected merely through the rotation of the wing nut 11.

Figure 2:
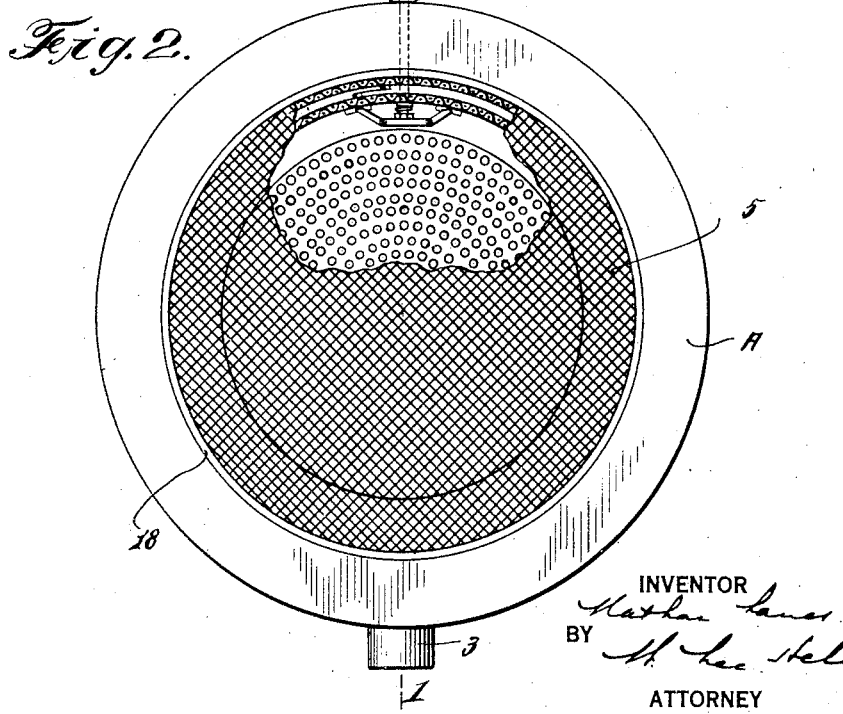
Figure 2 is a plan view of the same.

The expander ring may be serrated on its outer surface as shown at $4^x$, Fig. 9, and its use need not be confined to the form of casing illustrated in Figs. 1 and 2. In Figs. 8, 11 and 12 I have shown a casing B in modified form, having a straight unchanneled outer and inner wall.

In the said modification the casing may be provided with inwardly projecting separator shoulder 13 against which the screen folded about the inner edge of each expander may abut, as shown in Figs. 8 and 11. In such case the expanding mechanism may be that illustrated in Figs. 3 and 4.

The device is applicable to rotary filters and is shown in that connection in Figs. 11 and 12. A hollow hub 14 is provided and each screen is clamped against a shoulder 15 of the hub by a clamping ring 16 threaded upon the hub. In the use of such a filter the hub is placed upon a hollow shaft and the liquid passes from the screen portion of the filter through an aperture or apertures 17, into the hub and through the hollow shaft to a final point of discharge, as will be understood by those skilled in the art. Intermediate members 15 and the screen may be placed rubber washer rings similar to those indicated at 18, Fig. 1, if desired. These rings assist in creating a tight joint.

Having described my invention what I claim and desire to secure by Letters Patent is as follows, it being understood that various modifications may be made in the form and arrangement of the elements illustrated in the drawings without departing from the spirit of the invention, it being understood that asbestos, pulp, infusorial earth, etc. may be placed upon the screen as a filtering medium, as supplementing the action of the screen itself.

I claim—

1. In filters for liquids, a casing having an annular screen-contact wall, a screen, an expander ring receiving said screen and placed in such position that a section of the screen is placed intermediate the ring and said wall, and means for expanding the ring to radially expand the screen and to carry an annular marginal section thereof into forcible contact with said wall, as and for the purpose set forth.

2. In filters for liquids, a casing having a screen-contact wall, a screen, a split ring so related to the screen that a section of the latter lies intermediate the ring and said wall, the ring being shielded by the screen, a toggle having connections with each end of the ring, a screw stud connected to the toggle and projecting through the casing, a bridge-piece carried by the stud, a spring engaging the bridge-piece and the toggle, and means for moving the stud endwise to actuate the toggle and expand the ring.

3. In drum filters for liquids, a casing, an annular channel formed in the casing, a split ring disposed in the channel, a screen having a section lying within the channel intermediate a wall thereof and the ring and shielding the latter, and means for rechanging the diameter of said ring from a point exterior of the casing.

4. In filters for liquids, a casing having opposed faces, each face having formed therein an annular inwardly projecting channel, a screen for each face of the casing, said screen having a section disposed within the channel, and means in each channel for expanding the screen radially and forcing an annular marginal section thereof against the outermost wall of the channel.

5. In filters for liquids, a casing having an annular screen-contact wall, a screen, a ring receiving said screen and placed in such position that a section of the screen is placed intermediate the ring and said wall and the ring lies within the casing shielded by the main body of the screen, and means for changing the diameter of the ring to carry the screen into forcible contact with said wall, as and for the purpose set forth.

6. A device constructed in accordance with claim 5 in which the ring is provided with a serrated face for direct contact with the screen.

In testimony whereof, I have signed my name to this specification.

NATHAN LANES.